United States Patent [19]

Nobukawa et al.

[11] Patent Number: 4,523,632
[45] Date of Patent: Jun. 18, 1985

[54] COOLING SYSTEM OF ROTARY FLUID PRESSURE CYLINDER FOR CHUCKING IN MACHINE TOOLS

[75] Inventors: Akira Nobukawa; Tatsue Sawaguchi, both of Hiroshima, Japan

[73] Assignee: Kitagawa Iron Works Co. Ltd., Japan

[21] Appl. No.: 144,008

[22] Filed: Apr. 28, 1980

[30] Foreign Application Priority Data

Apr. 26, 1979 [JP] Japan ................................ 54-52299

[51] Int. Cl.$^3$ ............................................. F24H 3/00
[52] U.S. Cl. ...................................... 165/47; 92/106; 92/144; 74/606 A
[58] Field of Search ...................... 92/106, 144; 279/4; 165/47; 74/606 A; 310/62

[56] References Cited

U.S. PATENT DOCUMENTS

| | | | |
|---|---|---|---|
| 1,564,742 | 12/1925 | Acker | 165/47 X |
| 2,147,391 | 2/1939 | Acker | 74/606 A |
| 2,756,614 | 7/1956 | Kobayashi | 74/606 A |
| 2,835,227 | 5/1958 | Gamet | 92/106 |
| 3,285,328 | 11/1966 | Woodward | 165/47 |
| 3,417,636 | 12/1968 | Randolph | 165/47 |

Primary Examiner—Albert W. Davis, Jr.
Assistant Examiner—Margaret A. Focarino
Attorney, Agent, or Firm—William A. Drucker

[57] ABSTRACT

This invention relates to a cooling mechanism of a rotary hydraulic cylinder for chucking operation of machine tools. In a rotary hydraulic cylinder which consist of a rotor member having a reciprocable piston inside and in which working oil is fed to the piston in said rotor member, many fins are mounted, parallel to the movements of said piston rod, on the outer periphery of said working oil supplying member, and a cylinder-like cover whose side facing to said rotor member is folded inside to make a flange, is mounted at the edge, of said fins, facing said rotor, so that it may partially enclose the outer peripheral surface of said rotor member. The side of the rotor member enclosed by said cylinder-like cover, of said oil supplying member is provided with a rotary fan which rotates together with said roller member, thereby causing an air inlet opening of a fixed clearance between said cover and the rotary fan to be formed. Therefore, air flow is then produced through the outer peripheral surface of said rotor member toward said working oil supplying member as said rotor member starts to rotate. Said air flow can effectively cool the working oil and the whole chucking mechanism and thereby protect them from bad influences which may be caused by temperature rise.

3 Claims, 6 Drawing Figures

FIG. 3
FIG. 4
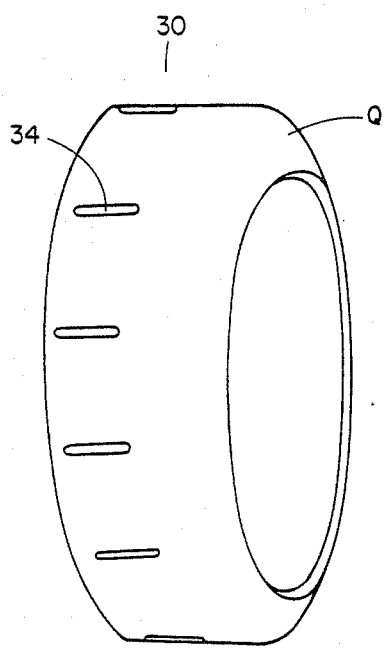
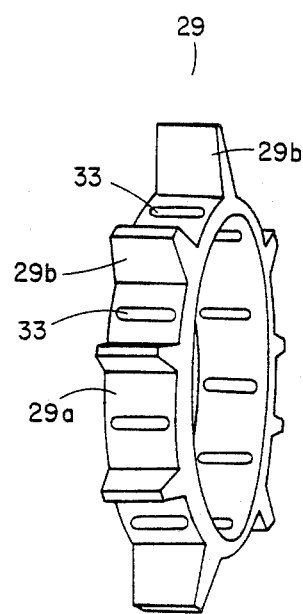

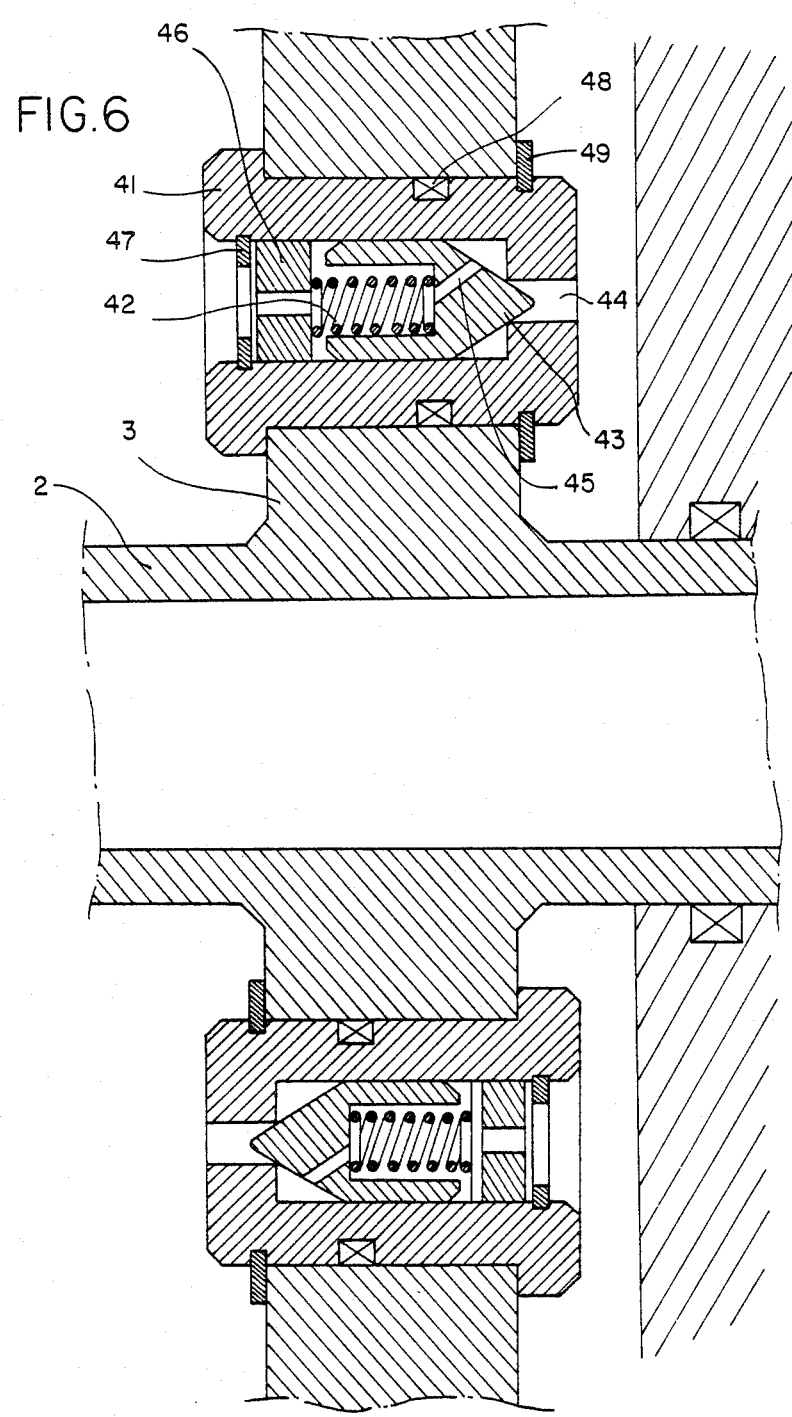

COOLING SYSTEM OF ROTARY FLUID PRESSURE CYLINDER FOR CHUCKING IN MACHINE TOOLS

BACKGROUND OF THE INVENTION

A rotary hydraulic cylinder of the conventional nature has an inherent default that, when it is used at speeds of more than 5,000 r.p.m., the bearings of rotary shafts are usually overheated to cause the temperature of the whole device to rise and the capacity of such rotary cylinders to be impaired.

To prevent such a temperature rise in the prior art, it has been suggested: (1) the whole circulation volume of a working oil is increased to obtain natural cooling by increasing the capacity of an oil tank, (2) radiation cooling is obtained by promptly providing the heat generating section with fins and (3) a cooler is mounted on the hydraulic circuits of the working oil. Actually however, such equipment as mentioned above are large-sized or complicated in structure, thereby causing such equipment to be high-priced.

OBJECTS OF THE INVENTION

One of the important objects of the present invention is to make it possible to use a rotary cylinder at a high speed by only a simple remodelling which is inexpensive and does not make an equipment large-sized and complicated.

Another important object of the present invention is to keep a high machining accuracy through a period of use by preventing a temperature rise of the working oil and the whole equipment.

Still another object of the present invention is to provide a cooling effect subject to the heat level generated in proportionate to the number of revolutions.

A still further object of the present invention is to lengthen the service life of the working oil by preventing it from being aged or worsened by high speed revolution.

Still another object of the present invention is to eliminate the causes of many kinds of troubles, eg. damage of a workpiece or variation of a chucking force, which may be caused by expansion of the volume of the working oil in said cylinder, and to ensure that it is possible to make the cylinder small and light, to make the thickness of cylinder wall thin and/or to reduce the cylinder diameter.

Another object of the present invention is to reduce the use volume of the working oil, thereby permitting the oil tank to small-sized, and accordingly to contribute to the energy saving.

These and further objects of the present invention will become obvious upon an understanding of the following descriptions.

BRIEF DESCRIPTION OF THE DRAWINGS

FIG. 3 is a perspective view of a cylinder-like cover disclosed by the present invention.

FIG. 4 is perspective view of a fan also disclosed by the present invention.

FIG. 6 is a partially longitudinal sectional view showing the details of a check valve mounted at the piston.

DESCRIPTION OF THE PREFERRED EMBODIMENT

Figure 1:
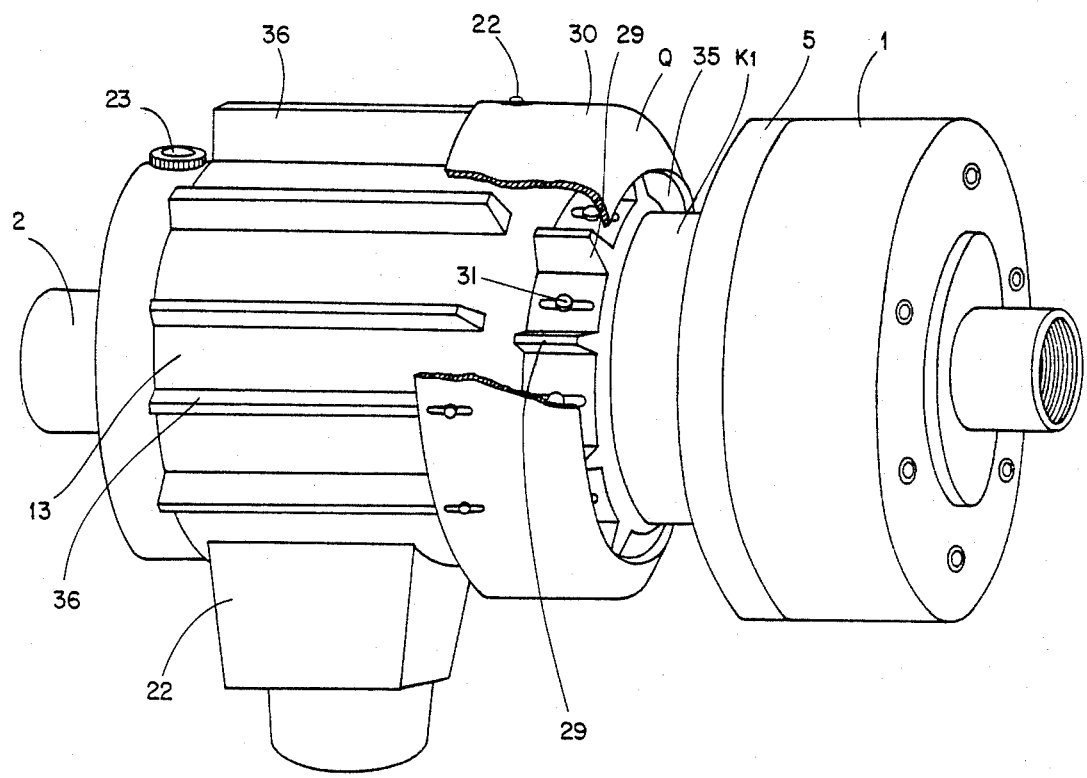
FIG. 1 is a perspective view of the whole device of the present invention.

A cylinder is indicated at 1, A piston rod is indicated at 2. A piston 3 is fixed at said piston rod 2, which is slidably placed in the bore 4 of said cylinder 1.

A rotary valve 5 is fitted to the said piston rod 2 and is provided with locking mechanisms 6 and 6' that block the oil flow. Then, said rotary valve 5 is linked with said cylinder 1 by means of bolts 7.

O-rings are indicated at 8, 9 and 10, which are used to keep the tightness. A guide pin 11 is fixed at said piston 3 and respective ends P and P' of said guide pin are guided in a hole 12, for said guide pin, which is provided in said cylinder 1 or said rotary valve 5 (the valve side in the illustration attached herewith), thereby causing free turn of said piston rod 2 to be limited.

Figure 2:
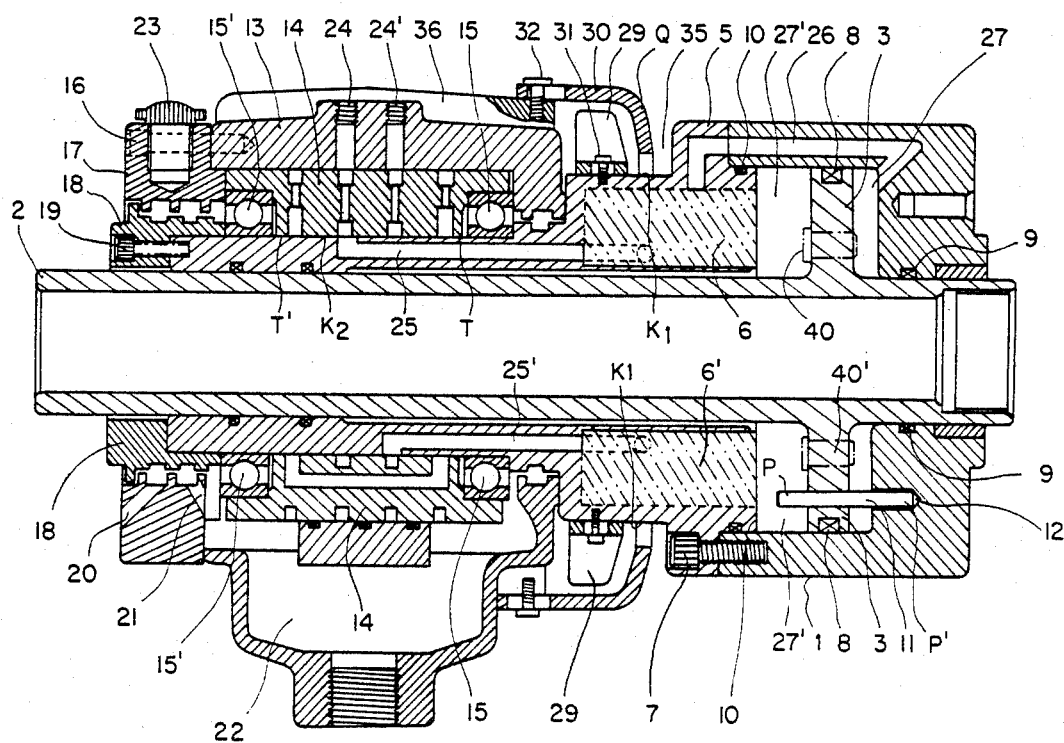
FIG. 2 is a longitudinal sectional view of the whole device of the present invention.

In FIG. 2, the right-hand end of said piston rod 2 is linked to a draw tube and is used to move jaws (not shown) of a chuck proper (not shown). On the other hand, said rotary valve is formed to become 2-staged key portions K and K' and its lower staged section is provided with a sleeve body 13. A sleeve 14 is placed in said sleeve body 13 as described below. Namely, one (15 in the illustration) of the bearings 15 and 15' inserted into either end of the said sleeve is directly fitted to the inner wall of said sleeve 14 and the other bearing (15' in the illustration) is directly fitted to the inner wall of the sleeve cover 17 linked to said sleeve body 13 by bolts 16. The edge of said lower staged section is provided with a stopper 18 fixed thereto by means of bolt 19. The connection between said stopper 18 and said sleeve cover is formed to become convex/concave-shaped like a labyrinth sealing structure. Therefore, oil coming from outside is drained externally through a drain port 20, but oil that leaks out from inside is collected in a drain reservoir 22 located in said sleeve body 13 through a drain groove 21. At this time, an air plug 23 is formed on the sleeve cover 17 to make it secure and easy to separate and distinguish the drain and the collection.

Next, the operation of said piston 3 in said cylinder 1 will be described in detail. Namely, the working oil coming from an outside oil supply apparatus (usually an oil tank) passes through an oil channel 25 by way of oil supply port 24 of said sleeve body 13, and is led to an oil channel 26 and an oil chamber 27 through said locking mechanism 6, thereby causing said piston 3 to move leftwards in the illustration of FIG. 2. The exhaust oil in an oil chamber 27', which is pushed out according to the movements of said piston 3 passes through an oil channel 25' by way of a locking mechanism 6' and is then collected in said outside oil supply apparatus (oil tank) from a drain port 24'.

When the return stroke of said piston is started after the forward stroke of said piston is terminated as shown above, a change-over valve (not shown) is changed over so that the above drain port 24' may be used as an oil supply port and said supply port 24 may be used as an exhaust port.

Then, the return stroke of said piston is carried out in the reverse of said forward stroke. At this time, a small volume of the working oil passes through clearance T and T' between said rotary valve 5 and sleeve 14 and is then supplied to both bearings 15 and 15' for lubrication.

After that, it returns into said outside oil supplying apparatus (oil tank) through a drain reservoir 22.

As shown in the above description, a workpiece (not shown) is chucked by jaws by means of the above hydraulic operating circuits. During machining of the workpiece, the heat energy generated by high speed revolution of said rotary valve 5 will heat the working oil in the hydraulic channels 25, 25', 26 and 26', and oil reservoir 27 and 27', causing the oil temperature to rise. The main heat-generating sources are (1). shearing heat at rotating portions of the working oil, (2). friction heat of bearing and agitating heat of said working oil at said bearing and (3) conversion heat accompanied by leakage of the working compressed oil.

The oil temperature rise caused by thus generated heat will lower the viscosity of the working oil and will cause said piston to vibrate. Furthermore, oil leakage may be increased to cause hydraulic energy to be lost. The loss of hydraulic energy may weaken the chucking force of jaws in the chucking device and causes the machining accuracy to be reduced. Namely, such a loss often becomes a cause of many kinds of troubles.

However, the equipment disclosed by the present invention can effectively prevent the whole cylinder apparatus and the working oil from temperature rise as shown in belows;

A fan is indicated at 29. Said rotary valve 5 where said fan 29 is mounted is provided with a concave portion of a key-like staged section $K_1$. A cylinder-like cover 30 has a folded flange Q at the front of said fan 29 in order to cause air to be sucked in along the concave part of said key-like staged section $K_1$, thereby causing the atmosphere (air) to flow from the surface of the front cylinder 1 backward toward said sleeve body 13 by way of said key-like staged section $K_1$ of said rotary valve 5, and the surface area of the outer peripheral surface is widened and accordingly the heat radiation area is also increased, thereby causing effective cooling to be secured. Bolts 31 and 32 are used to fix said fan and said cylinder-like cover. If some heat absorbing material is packed or circulated in a hollow part formed inside said cylinder-like cover 30 when the present invention is embodied in practice, more effective cooling can be secured. It is better for cooling effect that said fan 29 is of a variable-pitch structure. It is still better for the purpose that said fan 29 is slidably mounted on a key-staged section $K_1$ of said rotary valve by means of slots 33 or said cylinder-like cover 30 is slidably mounted on said fins by means of slots 34, thereby permitting the clearance for air intake to be readily changed (See FIGS. 3 and 4).

Said fan 29 shown in FIG. 4 is so composed that a plurality of blades 29b are mounted in a row, in the same direction as that of said piston rod, on the outer periphery of a ring 29a whose inside diameter is the same as that of the upper key-staged section of said rotary valve 5.

Important features of said fan are that it is simple in structure and that it can be cheaply manufactured. Besides, it is excellent in the point that no change in air flow may be caused even if the rotation direction is changed. Further, many fins 36 are also mounted, parallel to each other, longitudinally of the cylinder and parallel to said piston rod 2 on the outer peripheral surface of said sleeve body 13.

According to the cooling mechanism disclosed by the present invention, air begins to flow along the outer periphery of said cylinder 2 to firstly cause the cylinder itself to be cooled, thereby contributing to lowering the temperature of the working oil in the oil channels and in the cylinder.

As shown above, providing a key-like staged section and fins causes the contact area with said air for cooling to be increased, thereby more effective cooling being secured. Especially it is very favorable that heat-absorbing effect around an air inlet port 35 of said cylinder-like cover 31 prevents the piston operation from being influenced by heat. This becomes one of the great features from the standpoint of machining accuracy as the cylinder's clamping force is not changed. Another important point is that open air for cooling usually flows from the cylinder 1 to the sleeve body 13. This can be favorable especially to a lathe. Namely, as this way of cooling is usually to shift air from the spindle side to its opposite side, there is no risk that the head section of a lathe is reversely heated by air whose temperature rises during shifting. Therefore, no bad influence may be given to the head section of the lathe by hot air.

Though the heat energy generated around the sleeve 14 in the sleeve body 13 and around the bearings 15 and 15' is usually transmitted toward the rotating cylinder, the above heat transmission can be effectively interrupted by the cooling system disclosed by the present invention because the direction along which cooling air flows is completely reversed against the direction of heat transmission as shown in the above description. Although heat generation is increased in proportion to the increase of revolution speed, the cooling effect suitable for increasing of heat generation can be expected because the flow volume of cooling air is proportionately increased (strengthened).

In the cooling system disclosed by the present invention, no separate drive source is required and no revolution speed controlling means is required at all. Besides, said fan itself has indirect heat radiation.

In this preferred embodiment, key-like staged section K and $K_1$ have been formed downwards toward the side of said sleeve body 13. However, said sections K and $K_1$ can be formed to be upward or even in relation to the relative size of the rotor member and of the sleeve body. In all cases, it is determined that the position where said fan 29 is to be mounted is the outer peripheral position of the rotor member where the rotor member is adjacent to the sleeve body.

Actually observing the cooling effect of said fan, a high temperature of 70° C. to 80° C. was measured, at an atmospheric temperature 30° C., with a lathe run at the speed of 7,000 r.p.m. at the position of fins mounted on the sleeve body when no fan was provided. However, with said fan provided in position, the temperature was limited to 50° C. at most under the same conditions.

Figure 5:
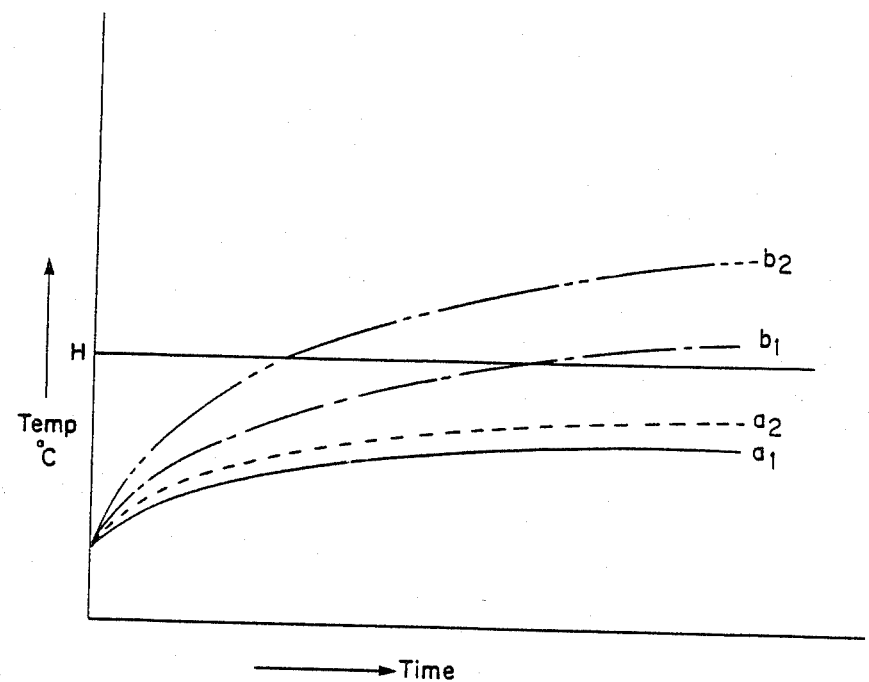
FIG. 5 is a linear graph showing the condition of temperature rises of a working oil.

The temperature rise of the working oil with elapse of running hours, for two examples, one of which is provided with a conventional rotary cylinder not having the cooling system disclosed by the present invention and the other of which is provided with said cooling system disclosed by the present invention, is shown on the graph of FIG. 5.

Referring to said graph, H indicates the limit of the use temperature of the working oil, $a_1$ and $a_2$ indicate the case where a lathe is provided with the cooling system of the present invention, $a_1$ shows the temperature rise with a lathe run at 3,500 r.p.m. and $a_2$ shows it when the lathe is run at 7,000 r.p.m. $b_1$ and $b_2$ indicate the case where a lathe, not having the cooling system disclosed by the present invention, is provided only with a conventional rotary cylinder. $b_1$ indicates the temperature rise with the lathe run at 3,500 r.p.m. and $b_2$ indicates it at 7,000 r.p.m.

As shown in this linear graph of FIG. 5, with the cooling system of the present invention used, almost no difference of temperature of the working oil is caused even if the revolution speed is doubled and the temperature can be maintained at less than the limit use temperature of the oil. On the contrary, there is a great difference of temperature rise between 3,500 r.pm. and 7,000 r.p.m. in the case of the conventional rotary cylinder. Further the, temperature rise lasts long and the temperature is not easily kept down and exceeds the limit of use temperature of the oil soon, causing many kinds of trouble as described before.

Referring to FIG. 2 again, relief valves 40 and 40' are mounted at the piston ring 3, whose details are described in FIG. 6.

A headed housing 41 is mounted, in the piston 3, and a needle valve 43 resiliently loaded by a spring 42 opens and closes the oil channel 44. An oil port 45 is drilled in said needle valve. A spacer with a hole is indicated at 46, O-ring is indicated at 48, and a set collar is indicated at 49.

At this time, said relief valves 40 and 40' are so mounted that the valve operation (open and close) may become reverse. In case there is a remarkable difference between the temperature of open air and the temperature of the working oil inside said cylinder, these relief valves 40 and 40' operate (open and close) so that they may protect said cylinder from being broken or damaged by abnormal pressure which may be caused by expansion of the working oil.

We claim:

1. A rotary hydraulic cylinder device, for mounting on a spindle of a machine tool for operating a workpiece chuck, comprising:

(i) an oil supply unit
(ii) a rotor having an axial portion disposed within said oil supply unit, said axial portion having a first outer circumferential surface, and a second outer circumferential surface of smaller diameter than said first surface, said axial portion including oil flow passages,
(iii) first and second bearing means disposed between said oil supply unit and said axial portion and respectively positioned axially beyond each end of said second circumferential surface, whereby said rotor may rotate about an axis relative to said oil supply unit,
(iv) fan means mounted on said axial portion at said first circumferential surface
(v) a plurality of cooling fins disposed externally on said oil supply unit, said fins being elongated and positioned extending along said supply unit parallel to the axis of rotation of the rotor,
(vi) a cylindrical cover element on said oil supply unit, said cover element overlying part of each of said cooling fins and extending axially over said fan means and having a flange which extends inwardly towards said second circumferential surface so as to bound therewith an air gap, whereby upon rotation of said rotor and said fans means, external air is drawn by said fan means in through said air gap in contact with said first circumferential surface and is thereafter propelled outwardly from said cover past said cooling fins.

2. A rotary hydraulic cylinder device, as claimed in claim 1, wherein said fan means comprises a plurality of elongated fan blades which are disposed parallel to the axis of rotation.

3. A rotary hydraulic cylinder device, as claimed in claim 1 or in claim 5, wherein said cover element is hollow and has heat-absorbing substance therein.

* * * * *